US012794910B2

(12) United States Patent
Ezrielev et al.

(10) Patent No.: US 12,794,910 B2
(45) Date of Patent: Nov. 10, 2026

(54) SYSTEM AND METHOD FOR DATA DRIFT DETECTION WHILE PERFORMING ANOMALY DETECTION

(71) Applicant: Dell Products L.P., Round Rock, TX (US)

(72) Inventors: Ofir Ezrielev, Beer Sheva (IL); Nadav Azaria, Beer Sheva (IL); Avitan Gefen, Tel Aviv (IL)

(73) Assignee: Dell Products L.P., Round Rock, TX (US)

(*) Notice: Subject to any disclaimer, the term of this patent is extended or adjusted under 35 U.S.C. 154(b) by 805 days.

(21) Appl. No.: 17/938,806

(22) Filed: Oct. 7, 2022

(65) Prior Publication Data

US 2024/0121253 A1 Apr. 11, 2024

(51) Int. Cl.
*H04L 9/40* (2022.01)
*H04L 41/16* (2022.01)

(52) U.S. Cl.
CPC .......... *H04L 63/1425* (2013.01); *H04L 41/16* (2013.01)

(58) Field of Classification Search
None
See application file for complete search history.

(56) References Cited

U.S. PATENT DOCUMENTS

| | | | |
|---|---|---|---|
| 9,097,542 | B2 | 8/2015 | Morlock et al. |
| 11,449,786 | B2 | 9/2022 | Gottschlich |
| 11,720,464 | B1 | 8/2023 | Ezrielev |
| 12,182,670 | B1 | 12/2024 | Beauchesne |
| 2010/0008594 | A1 | 1/2010 | Bialkowski |
| 2016/0226894 | A1 | 8/2016 | Lee |
| 2019/0138423 | A1 | 5/2019 | Agerstam et al. |
| 2019/0188065 | A1 | 6/2019 | Anghel |

(Continued)

OTHER PUBLICATIONS

Lara-Gutierrez, A., Fernandez-Gago, C. and Onieva, J.A., 2025. A Framework for Drift Detection and Adaptation in AI-driven Anomaly and Threat Detection Systems: A. Lara-Gutierrez et al. International Journal of Information Security, 24(5), p. 199. (Year: 2025).*

(Continued)

*Primary Examiner* — Luu T Pham
*Assistant Examiner* — Edward X Long
(74) *Attorney, Agent, or Firm* — WOMBLE BOND DICKINSON (US) LLP

(57) ABSTRACT

Methods and systems for detecting data drift while performing anomaly detection in a distributed environment are disclosed. To perform anomaly detection, a system may include an anomaly detector and one or more data collectors. The anomaly detector may detect anomalies in data obtained from one or more of the data collectors using a continuous inference model. To detect data drifts in data from the one or more data collectors, the anomaly detector may also detect anomalies in data obtained from one or more data detectors using a quantized inference model. The output of the continuous inference model may be compared to the output of the quantized inference model to determine whether the continuous inference model has adapted to data drift over time through re-training. Following anomaly detection and/or data drift detection, the data may be discarded to remove the data from the anomaly detector.

20 Claims, 11 Drawing Sheets

(56) References Cited

U.S. PATENT DOCUMENTS

| | | | |
|---|---|---|---|
| 2020/0285737 | A1 | 9/2020 | Kraus |
| 2020/0293870 | A1* | 9/2020 | Isikdogan ............ G06N 3/0464 |
| 2020/0334578 | A1 | 10/2020 | Ikeda |
| 2020/0364561 | A1 | 11/2020 | Ananthanarayanan |
| 2021/0048994 | A1 | 2/2021 | Yu |
| 2021/0064933 | A1 | 3/2021 | Bos |
| 2021/0097433 | A1* | 4/2021 | Olgiati ................ G06F 11/0793 |
| 2021/0133607 | A1 | 5/2021 | Stubbs |
| 2021/0133632 | A1 | 5/2021 | Elprin |
| 2021/0144211 | A1 | 5/2021 | Schnieders |
| 2021/0182556 | A1 | 6/2021 | Klug |
| 2021/0203576 | A1 | 7/2021 | Padfield |
| 2021/0406796 | A1 | 12/2021 | Liu |
| 2022/0004921 | A1 | 1/2022 | Balaraman |
| 2022/0027083 | A1 | 1/2022 | Zuolo |
| 2022/0030019 | A1 | 1/2022 | Neuvirth |
| 2022/0171863 | A1* | 6/2022 | Green ..................... G06F 21/87 |
| 2022/0172067 | A1 | 6/2022 | Kang |
| 2022/0188694 | A1 | 6/2022 | Suzani |
| 2022/0201490 | A1 | 6/2022 | Sedjelmaci |
| 2022/0329613 | A1* | 10/2022 | Abbaszadeh ....... H04L 63/1416 |
| 2022/0374677 | A1 | 11/2022 | Wang et al. |
| 2022/0382622 | A1 | 12/2022 | Ye |
| 2022/0391724 | A1 | 12/2022 | Yoon |
| 2022/0400121 | A1* | 12/2022 | Han ......................... G06N 5/04 |
| 2022/0417274 | A1 | 12/2022 | Madanahalli |
| 2023/0004863 | A1 | 1/2023 | Kanishima |
| 2023/0162038 | A1 | 5/2023 | Qi |
| 2023/0169147 | A1 | 6/2023 | Sivakumar |
| 2023/0229550 | A1 | 7/2023 | Zhao |
| 2023/0289660 | A1 | 9/2023 | Shi |
| 2023/0325725 | A1 | 10/2023 | Lester |
| 2023/0385456 | A1 | 11/2023 | Beauregard |
| 2023/0412627 | A1 | 12/2023 | Szilágyi |
| 2024/0046152 | A1 | 2/2024 | Lehmann |
| 2024/0095906 | A1 | 3/2024 | Gudovskiy |
| 2024/0104201 | A1 | 3/2024 | Makovoz |

OTHER PUBLICATIONS

Karri, N., 2022. AI-Powered Anomaly Detection. International Journal of Artificial Intelligence, Data Science, and Machine Learning, 3(2), pp. 122-131. (Year: 2022).*

Pang, Guansong, et al. “Deep Learning for Anomaly Detection: A Review”, ACM Comput. Surv., vol. 1, No. 1, Article 1, Jan. 2020. arXiv:2007.02500v3 [cs.LG] Dec. 5, 2020. 36 pages.

Finke, Thorben, et al. “Autoencoders for unsupervised anomaly detection in high energy physics”, Institute for Theoretical Particle Physics and Cosmology (TTK), RWTH Aachen University, D-52056 Aachen, Germany. arXiv:2104.09051v1 [hep-ph] Apr. 19, 2021. 32 pages.

Nassif et al., “Machine Learning for Anomaly Detection: A Systematic Review”, IEEE Access, 2021, vol. 9, pp. 78658-78700 (43 pages).

Nivarthi et al., “Towards Few-Shot Time Series Anomaly Detection with Temporal Attention and Dynamic Thresholding,” 2023 International Conference on Machine Learning and Applications (ICMLA), p. 1444~P1450 (Year: 2023).

He et al., “Unsupervised Log Anomaly Detection Based on Pretraining”, 2023 9th International Conference on Systems and Informatics (ICSAI), 6 pages (Year: 2023).

* cited by examiner

SYSTEM AND METHOD FOR DATA DRIFT DETECTION WHILE PERFORMING ANOMALY DETECTION

FIELD

Embodiments disclosed herein relate generally to anomaly detection. More particularly, embodiments disclosed herein relate to systems and methods to reduce computing resource expenditure and increase data security while performing anomaly detection and detecting data drift.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Figure 1:
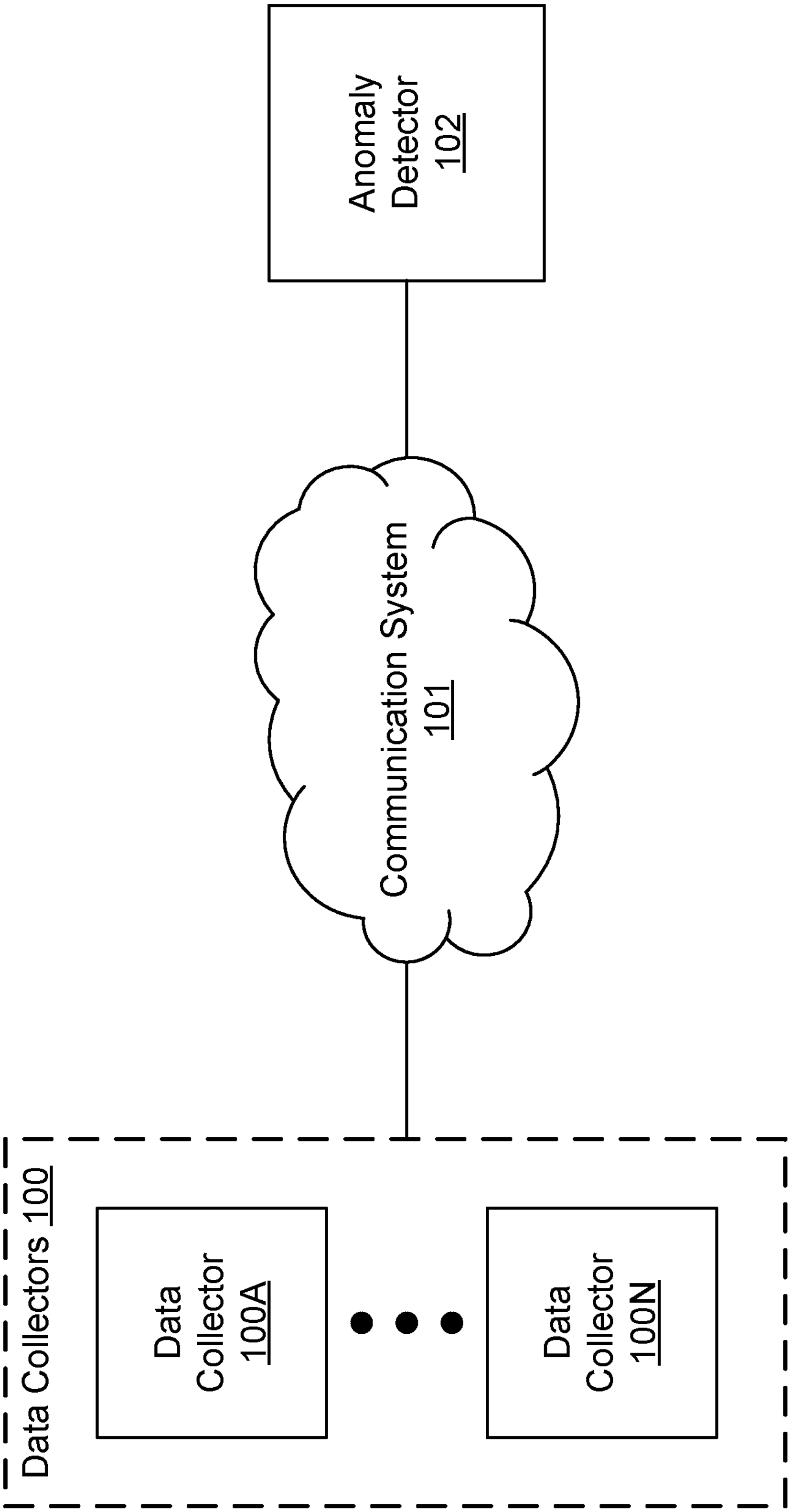
FIG. 1 shows a block diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

In general, embodiments disclosed herein relate to methods and systems for detecting data drift while performing anomaly detection in a distributed environment using inference models. To detect data drift while performing anomaly detection in a distributed environment, the system may include an anomaly detector. The anomaly detector may host and operate a first inference model used to detect anomalies in data obtained from one or more data collectors throughout a distributed environment. The first inference model may be a continuous inference model (e.g., an inference model trained to generate inferences based on continuous data) and may be re-trained over time to improve the anomaly detection capabilities of the continuous inference model. Re-training may be advantageous, for example, if new non-anomalous data is encountered by the continuous inference model and erroneously labeled as anomalous data. However, re-training the continuous inference model to expand the continuous inference model's ability to detect non-anomalous data may cause the continuous inference model to adapt to data drift. Adapting to data drift may or may not be advantageous to the computer-implemented services provided by the anomaly detector depending on the types of services and goals of the downstream users of the services.

To perform anomaly detection using inference models while detecting data drift, two inference models may be used: (i) the previously described continuous inference model and (ii) a quantized inference model. The quantized inference model may be trained using quantized training data and input data may be quantized prior to use as ingest for the quantized inference model. By quantizing the input data, the quantized inference model may be less sensitive to small inconsistencies between the input data and data used to train the quantized inference model (e.g., inconsistencies that, if encountered by the continuous inference model, may cause the continuous inference model to erroneously label new non-anomalous data as anomalous). Therefore, the quantized inference model may be less likely to (or forbidden to) adapt to data drift through re-training. Consequently, the anomaly detector may generate two inferences (sequentially or simultaneously): (i) a first inference using the continuous inference model and (ii) a second inference using the quantized inference model. The first inference and second inference may be classified (e.g., as anomalous or non-anomalous). If the first inference is classified as non-anomalous and the second inference is classified as anomalous, data drift may be present in the data. The anomaly detector may perform an action set to intervene with the data drift and/or may re-train one or both inference models to adapt to the data drift depending on the needs of the system performing the computer-implemented services.

To detect data drifts while performing anomaly detection, the anomaly detector may obtain data from one or more data collectors within a distributed environment. The anomaly detector may determine whether the data includes an anomaly using the continuous inference model. To determine if the data includes an anomaly, a first inference may be obtained using the continuous inference model and the data, the first inference being intended to match a fixed output value when the data is not anomalous. The first inference may be other types of inferences (e.g., the output of an autoencoder intended to match the input data, or the like) without departing from embodiments disclosed herein. If the first inference does not match the fixed output value within a threshold, the data may be classified as anomalous data. If the first inference matches the fixed output value within the threshold, the data may be classified as non-anomalous data.

To determine whether data drift has occurred in the data obtained from the one or more data collectors, a second inference may be obtained using the quantized inference model and the data, the second inference being intended to match the fixed output value when the data is not anomalous. The second inference may be other types of inferences (e.g., the output of an autoencoder intended to match the input data, or the like) without departing from embodiments disclosed herein. The quantized inference model may be less likely to adapt to data drifts due to the quantized nature of the input data. In addition, the quantized inference model may be forbidden to adapt to data drifts (e.g., by not re-training the quantized inference model). To obtain the second inference, the anomaly detector may quantize the data (e.g., identify a quantized data value corresponding to each data value of the data) to ensure that the ingest of the quantized inference model matches the quantized data values of the quantized training set used to train the inference model. If the second inference does not match the fixed output value within the threshold, the data may be classified as anomalous data. If the second inference matches the fixed output value within the threshold, the data may be classified as non-anomalous.

The anomaly detector may compare the classification of the first inference (e.g., the first classification) and the classification of the second inference (e.g., the second classification) to determine whether data drift has occurred. If the first classification indicates no anomaly and the second classification indicates an anomaly data drift may be identified. Data drift may occur, for example, due to re-training of the continuous inference model over time to expand the continuous inference model's ability to map non-anomalous input data to the fixed output value. In response to the identified data drift, a process may be initiated (e.g., an action set that may include notifying a downstream consumer or other entity of the data drift and/or re-training the inference model if adapting to data drift is favorable). In the event that one or both of the inferences indicate the presence of an anomaly in the data, a process may be initiated (e.g., an action set that may include an action taken by the anomaly detector itself, notifying a downstream consumer that the data includes anomalous data, and/or other actions) in response to the anomaly. Both processes may include discarding the data following performance of the action set so no data may be accessed by a malicious attacker in the event of compromise of the anomaly detector.

Thus, embodiments disclosed herein may provide an improved system for detecting data drift while performing anomaly detection. The system may detect data drift by comparing the output of a quantized inference model to the output of a continuous inference model using the same input data. If the output of the continuous inference model indicates no anomaly and the output of the quantized inference model indicates an anomaly, data drift may be detected. The quantized inference model may be trained using quantized training data. Quantizing the training data (and all future input values) may ensure that the range of input values is accounted for during training and unseen non-anomalous data may be less likely to be erroneously labeled as anomalous data.

In an embodiment, a method of providing computer implemented services is provided.

The method may include: obtaining, by an anomaly detector, data from a data collector; classifying, by the anomaly detector, the data using a continuous inference model and an anomaly threshold to obtain a first classification, the first classification specifying whether the data is considered anomalous or non-anomalous; classifying, by the anomaly detector, the data using a quantized inference model and the anomaly threshold to obtain a second classification, the second classification specifying whether the data is considered anomalous or non-anomalous; making a first determination, by the anomaly detector, regarding whether the first classification matches the second classification; in a first instance of the first determination where the first classification does not match the second classification: identifying presence of data drift in the data; and performing a first action set in response to the identified data drift to modify operation of a device that provides, at least in part, the computer implemented services.

The method may also include: in a second instance of the first determination where the first classification matches the second classification: making a second determination regarding whether the first classification and second classification specify that the data is considered anomalous; in a first instance of the second determination where the first classification and the second classification specify that the data is considered anomalous: performing a second action set in response to the data being considered anomalous; and in a second instance of the second determination where the first classification and the second classification specify that the data is non-anomalous: discarding the data.

Classifying the data using the continuous inference model may include: obtaining a first inference using the continuous inference model and the data; making a third determination regarding whether the first inference is within an anomaly threshold; in a first instance of the third determination where the first inference is within the anomaly threshold, classifying the data as non-anomalous to obtain the first classification; and in a second instance of the third determination where the first inference is not within the anomaly threshold, classifying the data as anomalous to obtain the first classification.

Classifying the data using the quantized inference model may include: quantizing the data to obtained quantized data; obtaining a second inference using the quantized inference model and the quantized data; making a fourth determination regarding whether the second inference is within the anomaly threshold; in a first instance of the fourth determination where the second inference is within the anomaly threshold, classifying the data as non-anomalous to obtain the second classification; and in a second instance of the fourth determination where the second inference is not within the anomaly threshold, classifying the data as anomalous to obtain the second classification.

Quantizing the data may include: identifying a quantized data value corresponding to each data value of the data using a schema for quantizing data and a set of quantized data values; and obtaining the quantized data using the quantized data value corresponding to each data value of the data.

The schema may specify a range of the data uniquely corresponding to each quantized data value of the set of quantized data values.

The first action set may include alerting a downstream consumer of the data drift.

The first action set may include initiating a re-training process to obtain an updated inference model.

Initiating a re-training process may include: treating the data as training data; and re-training at least one of the continuous inference model and the quantized inference model using the training data to obtain the updated inference model.

Re-training the inference model may include: freezing a portion of the inference model prior to re-training the inference model to obtain a frozen portion of the inference model, and modifying portions of the inference model that are not part of the frozen portion of the inference model based on the data to obtain the updated inference model.

Freezing the portion of the inference model may render the frozen portion of the inference model unaffected by the re-training of the inference model.

In an embodiment, a non-transitory media is provided that may include instructions that when executed by a processor cause the computer-implemented method to be performed.

In an embodiment, a data processing system is provided that may include the non-transitory media and a processor, and may perform the computer-implemented method when the computer instructions are executed by the processor.

Turning to FIG. 1, a block diagram illustrating a system in accordance with an embodiment is shown. The system shown in FIG. 1 may provide computer-implemented services. The computer-implemented services may include any type and quantity of computer implemented services. For example, the computer-implemented services may include monitoring services (e.g., of locations), communication services, and/or any other type of computer-implemented services.

To provide computer-implemented services, the system may include anomaly detector 102. Anomaly detector 102 may provide all, or a portion of, the computer-implemented services. For example, anomaly detector 102 may provide computer-implemented services to users of anomaly detector 102 and/or other computing devices operably connected to anomaly detector 102. The computer-implemented services may include any type and quantity of services including, for example, anomaly detection.

To facilitate anomaly detection, the system may include one or more data collectors 100. Data collectors 100 may include any number of data collectors (e.g., 100A-100N). For example, data collectors 100 may include one data collector (e.g., 100A) or multiple data collectors (e.g., 100A-100N) that may independently and/or cooperatively facilitate the anomaly detection.

All, or a portion, of the data collectors 100 may provide (and/or participate in and/or support the) computer-implemented services to various computing devices operably connected to data collectors 100.

The computer-implemented services may include any type and quantity of services including, for example, anomaly detection in a distributed environment. Different data collectors may provide similar and/or different computer-implemented services.

When providing the computer-implemented services, the system of FIG. 1 may ascertain whether collected data is anomalous. To do so, the system of FIG. 1 may utilize two inference models that generates inferences usable to ascertain whether data is anomalous.

However, the quality of the computer-implemented services may depend on how well the system of FIG. 1 is able to ascertain whether data drift has occurred in data obtained from one or more data collectors. A continuous inference model trained to detect anomalies in continuous data may erroneously label unseen non-anomalous data (e.g., non-anomalous data not included in the training data used to train the continuous inference model) as anomalous data. In addition, attempts to re-train the continuous inference model to learn to identify unseen non-anomalous data may inadvertently cause the continuous inference model to adapt to data drift.

In general, embodiments disclosed herein may provide methods, systems, and/or devices for detecting data drift while performing anomaly detection. To detect data drift, two inference models may be used: (i) a continuous inference model trained using continuous training data and (ii) a quantized inference model trained using quantized training data. By quantizing the training data (and all data used as ingest for the quantized inference model), the quantized inference model may be less likely to erroneously label unseen non-anomalous data as anomalous data. By comparing the output of the continuous inference model to the output of the quantized inference model, the anomaly detector may discern whether the continuous inference model has adapted to data drift (as a result of re-training or otherwise). In the event of data drift, the anomaly detector may perform an action set including intervening with the data drift, adapting the quantized inference model to the data drift through re-training (if desirable), and/or other actions.

To provide the above noted functionality, the system of FIG. 1 may include anomaly detector 102. Anomaly detector 102 may (i) determine whether data (e.g., obtained from data collectors 100 and/or by itself) includes anomalous data using an inference model, (ii) quantize the data to obtain quantized data, (iii) determine whether the quantized data includes anomalous data using a quantized inference model, (iv) compare the output of the continuous inference model to the output of the quantized inference model to determine whether data drift has occurred, (v) perform an action set in response to an anomaly and/or data drift in the data, and/or (vi) discard the data after its use so that the data is not available to malicious attackers if anomaly detector 102 is compromised.

When performing its functionality, anomaly detector 102 and/or data collectors 100 may perform all, or a portion, of the methods and/or actions shown in FIGS. 3A-3D.

Data collectors 100 and/or anomaly detector 102 may be implemented using a computing device such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 5.

In an embodiment, one or more of data collectors 100 and/or anomaly detector 102 are implemented using an internet of things (IoT) device, which may include a computing device. The IoT device may operate in accordance with a communication model and/or management model known to the anomaly detector 102, other data collectors, and/or other devices.

Any of the components illustrated in FIG. 1 may be operably connected to each other (and/or components not illustrated) with a communication system 101. In an embodiment, communication system 101 may include one or more networks that facilitate communication between any number of components. The networks may include wired networks and/or wireless networks (e.g., and/or the Internet). The networks may operate in accordance with any number and types of communication protocols (e.g., such as the internet protocol).

While illustrated in FIG. 1 as including a limited number of specific components, a system in accordance with an embodiment may include fewer, additional, and/or different components than those illustrated therein.

Figure 2:
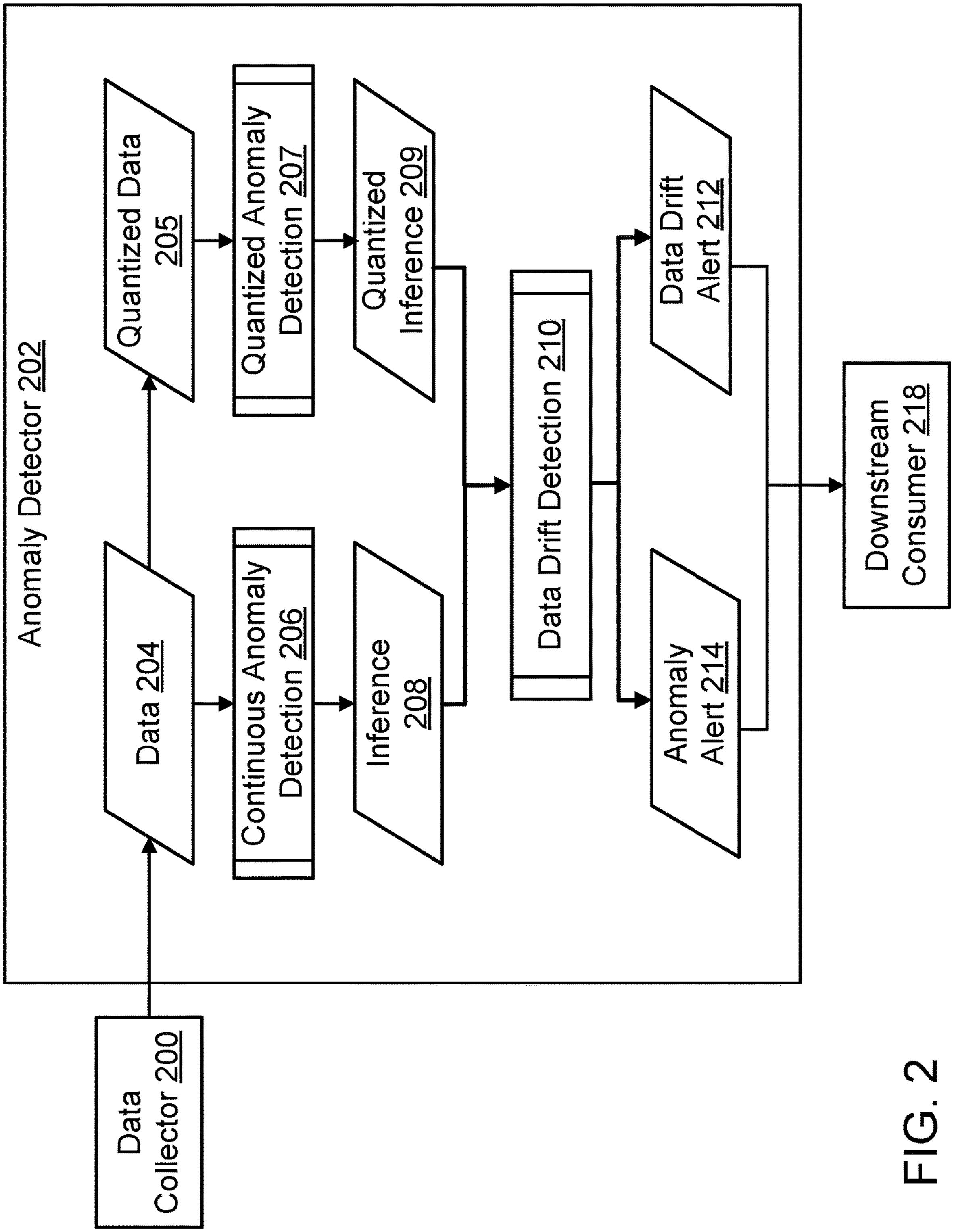
FIG. 2 shows a block diagram illustrating an anomaly detector over time in accordance with an embodiment.

To further clarify embodiments disclosed herein, diagrams illustrating data flows and/or processes performed in a system in accordance with an embodiment are shown in FIG. 2.

FIG. 2 shows a diagram of anomaly detector 202 interacting with data collector 200 and downstream consumer 218. Anomaly detector 202 may be similar to anomaly detector 102 shown in FIG. 1. In FIG. 2, anomaly detector 202 may be connected to data collector 200 and downstream consumer 218 via a communication system (not shown). Data collector 200 may be similar to any of data collectors 100. Communications between anomaly detector 202, data collector 200, and downstream consumer 218 are illustrated using lines terminating in arrows. In some embodiments, downstream consumer 218 may not be required.

As discussed above, anomaly detector 202 may perform computer-implemented services by processing data (e.g., via data drift detection and anomaly detection) in a distributed environment.

To perform data drift detection and anomaly detection in the distributed environment, anomaly detector 202 may obtain data 204 from data collector 200. Data 204 may include any type and quantity of data. Anomaly detector 202 may perform continuous anomaly detection 206 process on data 204 to determine whether data 204 includes anomalous data. Continuous anomaly detection 206 process may include generating an inference 208 using an inference model trained using continuous training data to map non-anomalous data to a fixed output value (e.g., a number that is not zero). The inference 208 may be compared to the fixed output value. Any inference that does not match the fixed output value within a threshold may indicate that the data 204 includes anomalous data. Any inference that matches the fixed output value within a threshold may indicate that the data 204 does not include anomalous data. Anomalous data may be considered unacceptable for the needs of downstream consumer 218. Therefore, downstream consumer 218 may desire to be notified of any anomalies in collected data. In some embodiments, anomaly detector 202 may respond directly to any anomalies and downstream consumer 218 may not be included in the system.

To determine whether data drift has occurred, anomaly detector 202 may quantize data 204 to obtain quantized data 205. Each data value in data 204 (that is non-anomalous) may be associated with a quantized data value included in the training data used to train a quantized inference model hosted by anomaly detector 202.

Anomaly detector 202 may perform quantized anomaly detection 207 process on quantized data 205 to determine whether data 204 includes anomalous data. Quantized anomaly detection 207 process may include generating a quantized inference 209 using the quantized inference model trained to map non-anomalous data to a fixed output value (e.g., a number that is not zero). The quantized inference 209 may be compared to the fixed output value. Any quantized inference that does not match the fixed output value within a threshold may indicate that the data 204 includes anomalous data. Any quantized inference that matches the fixed output value within a threshold may indicate that the data 204 does not include anomalous data.

Anomaly detector may perform data drift detection 210 process using inference 208 and quantized inference 209. Inference 208 and quantized inference 209 may be classified as either anomalous or non-anomalous depending on whether the inference 208 and quantized inference 209 match the fixed output value within the threshold as previously described. If the classification of inference 208 matches the classification of quantized inference 209, data drift may not be identified. If the classification of inference 208 indicates no anomaly and the classification of quantized inference 209 indicates an anomaly, data drift may be identified. Anomaly detector 202 may take different actions with respect to data 204 depending on whether data drift is identified.

In a first example of the actions that anomaly detector 202 may take, consider a scenario in which the inference 208 matches the fixed output value and, therefore, may not indicate the presence of anomalous data. When data 204 is classified as non-anomalous data, anomaly detector 202 may compare the classification of inference 208 to the classification of quantized inference 209. In this first example, quantized data 205 may not match the fixed output value and, therefore, may indicate the presence of anomalous data. Consequently, a data drift may be identified and the anomaly detector 202 may generate data drift alert 212. Data drift alert 212 may be transmitted to downstream consumer 218. Downstream consumer 218 may determine whether data drift is desirable for the system and may perform an action set including intervening with the data drift, providing anomaly detector 202 with instructions to perform a re-training to adapt to the data drift, and/or other actions. Alternatively, anomaly detector 202 itself may perform the action set in response to the data drift alert 212. In this example, downstream consumer 218 may or may not be included in the system. Following this action set, data 204, quantized data 205, inference 208, and quantized inference 209 may be discarded, transmitted to another device, and/or otherwise removed from anomaly detector 202. By doing so, data 204, quantized data 205, inference 208, and quantized inference 209 may not be available to malicious attackers if anomaly detector 202 is compromised.

In a second example of the actions that anomaly detector 202 may take, consider a scenario in which the data 204 is classified as anomalous data (as described above). Therefore, data drift detection 210 process may not be necessary, as the conditions for data drift have not been met. In this example, anomaly detector 202 may generate an anomaly alert 214. Anomaly alert 214 may be transmitted to downstream consumer 218. Downstream consumer 218 may initiate performance of an action set in response to anomaly alert 214. The action set may include sending the anomalous data (and/or a notification of the presence of anomalies in data 204) to downstream consumer 218. By doing so, downstream consumer 218 may be notified of the existence of the anomaly and may perform actions in response to this notification. Alternatively, anomaly detector 202 itself may perform the action set in response to the anomaly alert 214. In this example, downstream consumer 218 may or may not be included in the system. Following this action set, data 204, quantized data 205, inference 208, and quantized inference 209 may be discarded, transmitted to another device, and/or otherwise removed from anomaly detector 202. By doing so, data 204, quantized data 205, inference 208, and quantized inference 209 may not be available to malicious attackers if anomaly detector 202 is compromised.

In a third example of the actions that anomaly detector 202 may take, consider a scenario in which the inference 208 matches the fixed output value and is classified as non-anomalous. Data drift detection 210 process may also indicate no data drift in data obtained from data collector 200. When data 204 is classified as non-anomalous, data 204, quantized data 205, inference 208, and quantized inference 209 may be discarded, transmitted to another device, and/or otherwise removed from anomaly detector 202. By doing so, data 204, quantized data 205, inference 208, and quantized inference 209 may not be available to malicious attackers if anomaly detector 202 is compromised.

By discarding all data (e.g., data 204, quantized data 205, inference 208, quantized inference 209, etc.) no data may be stored on anomaly detector 202 for any significant duration of time. Therefore, malicious attackers attempting to compromise anomaly detector 202 may not be able to access any significant quantity of data in the event of an attack.

In an embodiment, anomaly detector 202 is implemented using a processor adapted to execute computing code stored on a persistent storage that when executed by the processor performs the functionality of anomaly detector 202 discussed throughout this application. The processor may be a hardware processor including circuitry such as, for example, a central processing unit, a processing core, or a microcontroller. The processor may be other types of hardware devices for processing information without departing from embodiments disclosed herein.

As discussed above, the components of FIG. 1 may perform various methods to perform anomaly detection in a distributed environment in which devices may be subject to malicious attacks. FIGS. 3A-3D illustrate methods that may be performed by the components of FIG. 1. In the diagrams discussed below and shown in FIGS. 3A-3D, any of the operations may be repeated, performed in different orders, and/or performed in parallel with or in a partially overlapping in time manner with other operations.

Figure 3A:
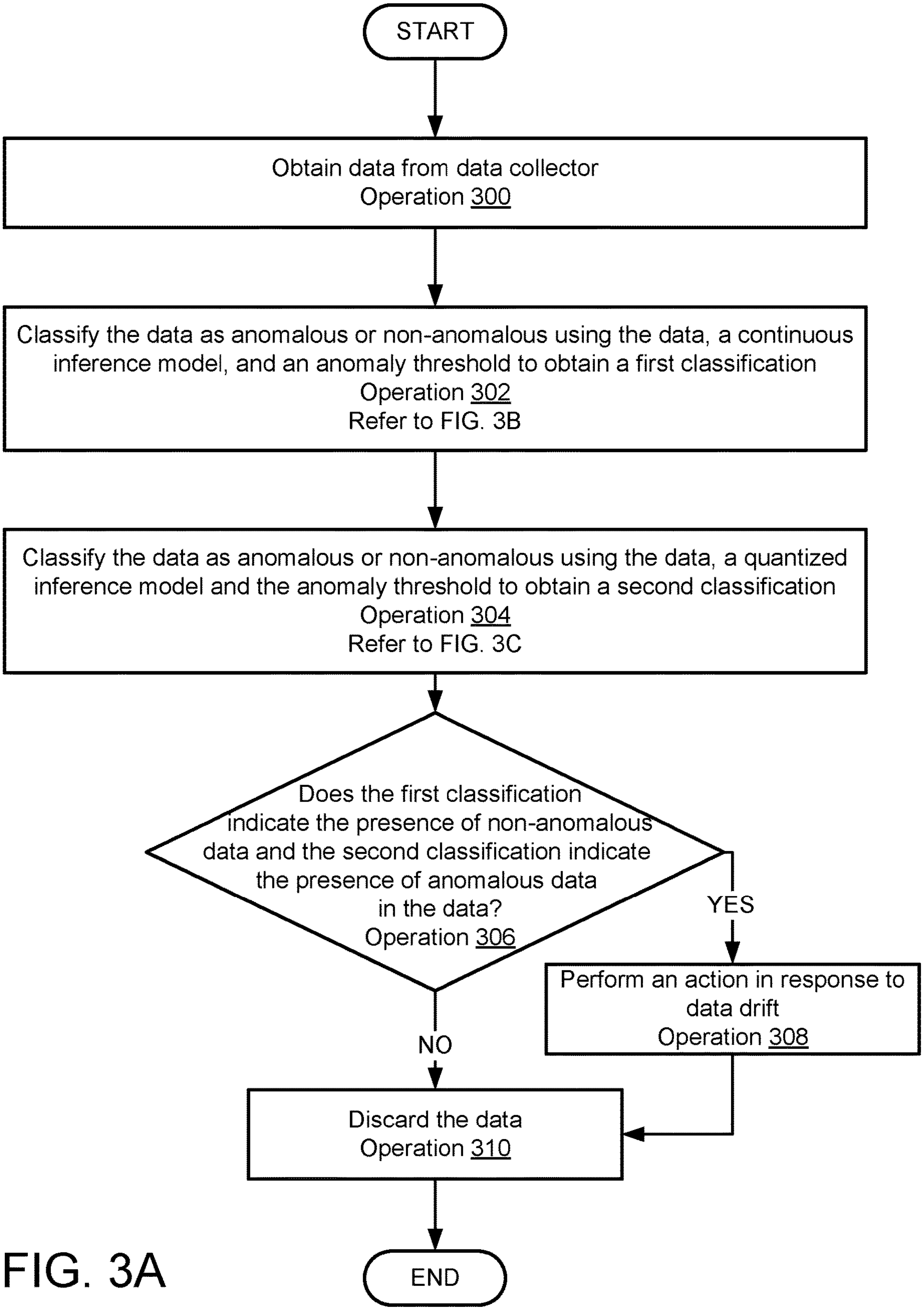
FIG. 3A shows a flow diagram illustrating a method of detecting data drift while performing anomaly detection using inference models in accordance with an embodiment.

Turning to FIG. 3A, a flow diagram illustrating a method of detecting data drift while performing anomaly detection using inference models in accordance with an embodiment is shown. The method may be performed, for example, by an anomaly detector, a data collector, and/or another device.

At operation 300, data is obtained from a data collector. The data collector may be any device (e.g., a data processing system) that collects data. For example, the data collector may include a sensor that collects data (e.g., temperature data, humidity data, or the like) representative of an ambient environment, a camera that collects images and/or video recordings of an environment, and/or any other type of component that may collect information about an environment or other source.

The obtained first data may include the live data (e.g., temperature readings, video recordings, etc.), aggregated statistics and/or other representation of the data (e.g., an average temperature, portions of the video, etc.) to avoid transmitting large quantities of data over communication system 101, and/or any other types of information.

The data may be obtained from data collectors 100 continuously, at regular intervals, in response to a request from anomaly detector 102, and/or in accordance with any other type of data collection scheme. For example, data collector 100A may include a camera that records continuous video of a property. The owners of the property may wish to be notified if any persons appear on the property outside the hours of 7:00 AM to 7:00 PM. Therefore, the video recordings collected during the hours of 7:00 PM to 7:00 AM may be selected by the data collector and transmitted to the anomaly detector for anomaly detection (e.g., identification of persons on the property outside the accepted times of 7:00 AM to 7:00 PM). The video recordings may be transmitted, for example, once per day after the time period has elapsed (e.g., at 7:00 AM). Following receipt of the first data, the anomaly detector 102 may determine whether the first data includes anomalous data as described below.

At operation 302, the data is classified as anomalous or non-anomalous using the data, a continuous inference model, and an anomaly threshold to obtain a first classification. To obtain the first classification, the anomaly detector 102 may determine whether the data includes anomalous data. The anomaly detector 102 may determine whether the data includes anomalous data using a first inference generated by the continuous inference model (e.g., an inference model trained to generate inferences based on continuous input data) using the data as input data (e.g., an ingest). Anomalous data may be data that deviates from typical data by a certain degree. Anomalous data may include, for example, an identification of a person at a particular location where the corresponding inference indicates that no person should be located. For additional details regarding obtaining the first classification, refer to FIG. 3B.

At operation 304, the data is classified as anomalous or non-anomalous using the data, a quantized inference model, and the anomaly threshold to obtain a second classification. To obtain the second classification, the anomaly detector 102 may quantize the data and determine whether the quantized data includes anomalous data. The anomaly detector 102 may determine whether the quantized data includes anomalous data using a second inference generated by the quantized inference model (e.g., an inference model trained to generate inferences based on quantized input data) using the quantized data as input data (e.g., an ingest). As previously described, anomalous quantized data may be data that deviates from typical data by a certain degree. For additional details regarding obtaining the second classification, refer to FIG. 3C.

At operation 306, it is determined whether the first classification indicates the presence of non-anomalous data and the second classification indicates the presence of anomalous data in the data. If the first classification (obtained from the continuous inference model) does not indicate an anomaly and the second classification (obtained from the quantized inference model) indicates an anomaly, data drift may be identified and the method may proceed to operation 308. If the first classification matches the second classification (and/or if the conditions mentioned above are not met for other reasons), data drift may not be identified and the method may proceed to operation 310.

At operation 308, an action set is performed in response to the data drift. The action set may include notifying a downstream consumer (and/or other entity) that data drift has occurred. The downstream consumer may be any entity desiring to be notified of data drifts in the data collected by the data collector. For example, the downstream consumer may be the owner of the property, a technician, and/or any other entity that may respond to the presence of data drifts in the data. The downstream consumer may be notified by sending one or more messages (e.g., an email alert, a text message alert, an alert through an application on a device) to the downstream consumer. The messages may include information (e.g., that data drift has occurred) regarding the data, a copy of the data itself, and/or other information. Other actions (e.g., initiating an alarm, automatically down an industrial process, and/or processes) may be performed when data drift is identified without departing from embodiments disclosed herein. In addition, the continuous inference model may be reverted to a previous version (e.g., a version before an instance of re-training that adapted the inference model to the data drift) to improve the anomaly detecting capabilities of the continuous inference model. Alternatively, the downstream consumer may be the anomaly detector 102 itself, and the anomaly detector 102 may take action in response to the data drift without notifying an additional entity of the presence of the anomaly.

In a first example, the downstream consumer may be a technician monitoring an industrial process and may determine that data drift is unacceptable for the system. In an industrial environment, a condition such as temperature, pH, humidity, etc. may drift. Data drifts may make the industrial process less efficient and/or may cause dangerous conditions to arise. The technician may intervene with the data drift to return the data to an acceptable range.

In a second example, the downstream consumer may be a technician monitoring a weather station and may determine that adapting to data drift (e.g., daily temperature fluctuations) is advantageous for anomaly detection. In this example, the technician may acknowledge the data drift and transmit instructions to the anomaly detector to re-train one or both of the inference models to adapt to the data drift. To re-train the inference models, the quantized data may be used as training data. The quantized data may be used as training data by labeling it as training data for ingest into a training process for an inference model. For additional details regarding re-training of inference models, refer to FIG. 3D.

In some embodiments, an anomaly may be detected along with (or separate from) the data drift. If an anomaly is detected, the anomaly detector 102 may also perform an action in response to the presence of an anomaly. The action set in response to the anomaly may include notifying a downstream consumer that the data may include anomalous data. The downstream consumer may be any entity desiring to be notified of anomalies in the data collected by the data collector. For example, the downstream consumer may be the owner of the property, a security team, and/or any other entity that may respond to the presence of anomalous data in the data. The downstream consumer may be notified by sending one or more messages (e.g., an email alert, a text message alert, an alert through an application on a device) to the downstream consumer. The messages may include information (e.g., that the data is anomalous) regarding the data, a copy of the data itself, and/or other information. Other actions (e.g., initiating an alarm, automatically shutting a security door, and/or processes) may be performed when anomalous data is identified without departing from embodiments disclosed herein. Alternatively, the downstream consumer may be the anomaly detector 102 itself, and the anomaly detector 102 may take action in response to the anomaly without notifying an additional entity of the presence of the anomaly.

At operation 310, the data is discarded. The data may be discarded to secure against data being accessed by a malicious attacker attempting to compromise an anomaly detector. The data may be discarded immediately following the action sets described in operation 308, and/or may be discarded after a previously determined duration of time (e.g., twice per day, etc.).

Discarding data may include deleting the data, transmitting the data to a device at an offsite location to be archived, and/or transmitting the data to another device for other purposes (in net, resulting in no copies of the data being retained on the anomaly detector). The data may be discarded via other methods without departing from embodiments disclosed herein. By doing so, any unauthorized entity (e.g., a malicious attacker) gaining access to the anomaly detector 102 via a malicious attack would not be able to access any data (e.g., due to the data not being stored in any memory or storage on the compromised device).

The method may end following operation 310.

Figure 3B:
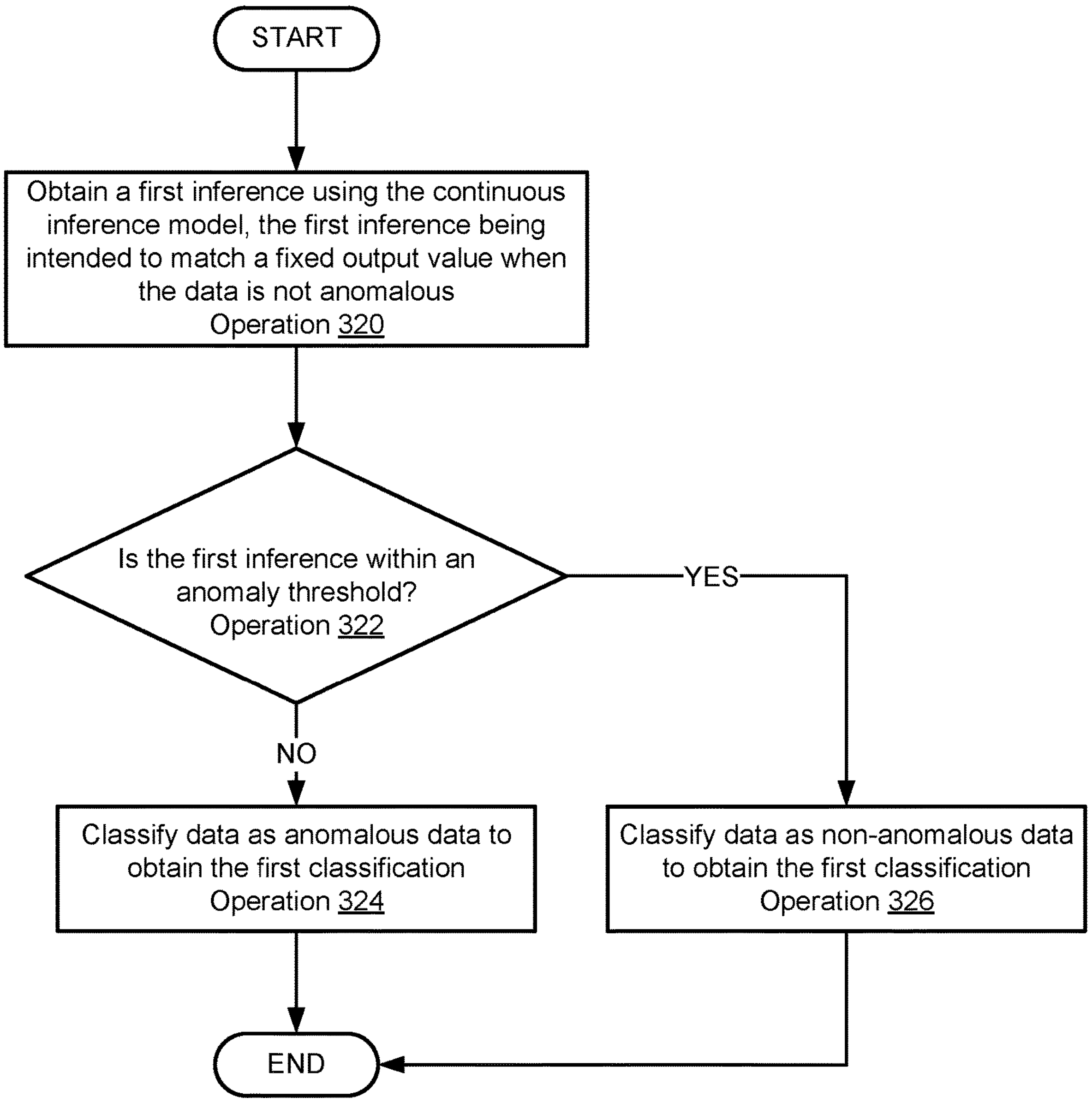
FIG. 3B shows a flow diagram illustrating a method of identifying anomalous data using a continuous inference model in accordance with an embodiment.

Turning to FIG. 3B, a flow diagram illustrating a method of identifying anomalous data using a continuous inference model in accordance with an embodiment is shown. The operations in FIG. 3B may be an expansion of operation 302 in FIG. 3A.

At operation 320, a first inference is obtained using the continuous inference model. The first inference may be intended to map to a previously established fixed output value within a threshold when the data is not anomalous. An output value outside of this threshold may indicate the presence of an anomaly in the data. The continuous inference model may be, for example, a machine learning model (e.g., a neural network) and/or any other type of predictive model trained to identify anomalies in continuous data obtained from data collectors 100. Refer to FIGS. 4A-4B for additional details regarding the continuous inference model. The continuous inference model may be trained using continuous anomaly detection training data (not shown) to obtain an initially trained model. Continuous anomaly detection training data may include a labeled dataset of data (e.g., including both anomalous and non-anomalous data) or may be unlabeled. For example, the anomaly detection training data may include frames of a video recording displaying a view of the property with no person present during certain times of the day and frames of the video recording displaying a few persons present during other times of the day. These frames may be labeled as including an expected number of persons within the frames (some or none depending on the frames). Therefore, the inference model may be trained to generate a fixed output value (e.g., 1 or any other value that is not zero) when the data is non-anomalous (e.g., video frames that include a few persons or no persons, depending on the time of the day). The continuous inference model may be re-trained to expand the anomaly detection capabilities of the continuous inference model. For additional details regarding re-training, refer to FIG. 3D. The first inference may be used to determine whether an anomaly is present in the data as described below.

At operation 322, it is determined whether the first inference falls within the anomaly threshold. The anomaly threshold may define a range of values of the first inference considered non-anomalous for the purposes of the computer implemented services provided by anomaly detector 102. If the first inference is within the anomaly threshold, the data may be considered non-anomalous. However, if the first inference falls outside the anomaly threshold, the data may be classified as anomalous, as shown in operation 324. For example, a frame of a video recording showing a person on the property may generate an output value outside the anomaly threshold (e.g., a range of output values indicating that no persons should be present at that time) and may be classified as an anomaly.

If it is determined that the first inference is within the anomaly threshold, then the method may proceed to operation 326. If not, the method may proceed to operation 324.

At operation 324, the data may be classified as anomalous data to obtain the first classification. The data may be classified as anomalous data by, for example, labeling (e.g., flagging) the data as being anomalous, initiating performance of various actions in response to the data being classified as being anomalous, and/or via other methods.

At operation 326, the data may be classified as non-anomalous data to obtain the first classification. The data may be classified as non-anomalous data by, for example, labeling (e.g., flagging) the data as being non-anomalous, initiating performance of various actions in response to the data being classified as being non-anomalous, and/or via other methods.

The method may end following operation 326.

Figure 3C:
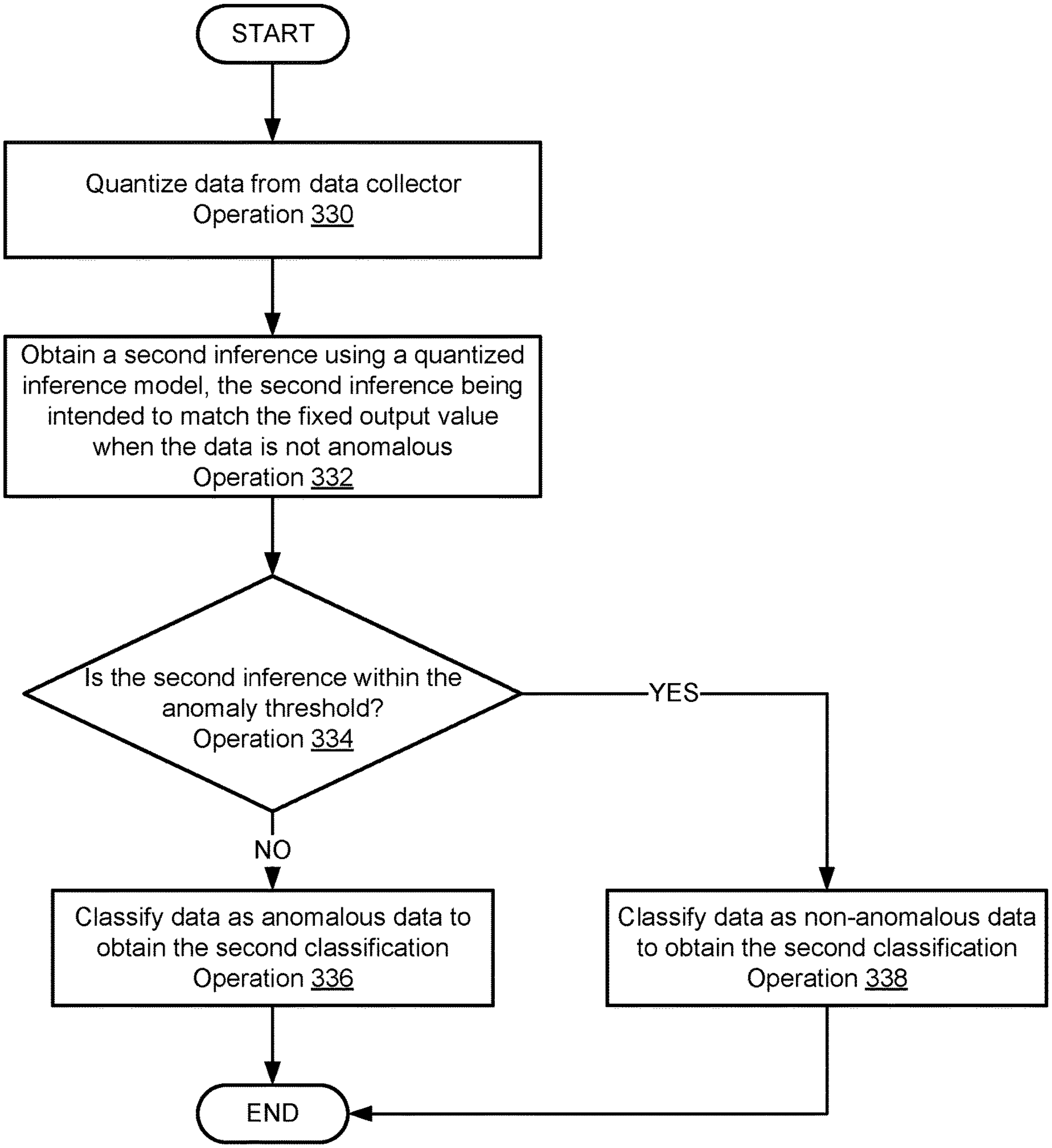
FIG. 3C shows a flow diagram illustrating a method of identifying anomalous data using a quantized inference model in accordance with an embodiment.

To determine whether data drift has occurred in data obtained from data collectors 100, anomaly detector 102 may perform a second anomaly detection process using a quantized inference model. Turning to FIG. 3C, a flow diagram illustrating a method of identifying anomalous data using a quantized inference model in accordance with an embodiment is shown. The operations in FIG. 3C may be an expansion of operation 304 in FIG. 3A.

At operation 330, the data from the data collector is quantized. The data may be quantized to ensure that the entire (or a substantial portion of the) range of non-anomalous data used as ingest for the quantized inference model performing anomaly detection has been previously seen by the inference model during training and, therefore, may be less likely to be erroneously labeled as an anomaly. To quantize the data, a quantized data value corresponding to each data value of the data may be identified using a schema for quantizing data and a set of quantized data values. The schema may specify a range of the data uniquely corresponding to each quantized data value of the set of quantized data values. The set of quantized data values may encompass all (or a subset of) possible values of the data that are non-anomalous. By doing so, quantized data may be obtained and used as ingest for a quantized inference model as described below.

Figure 4A:
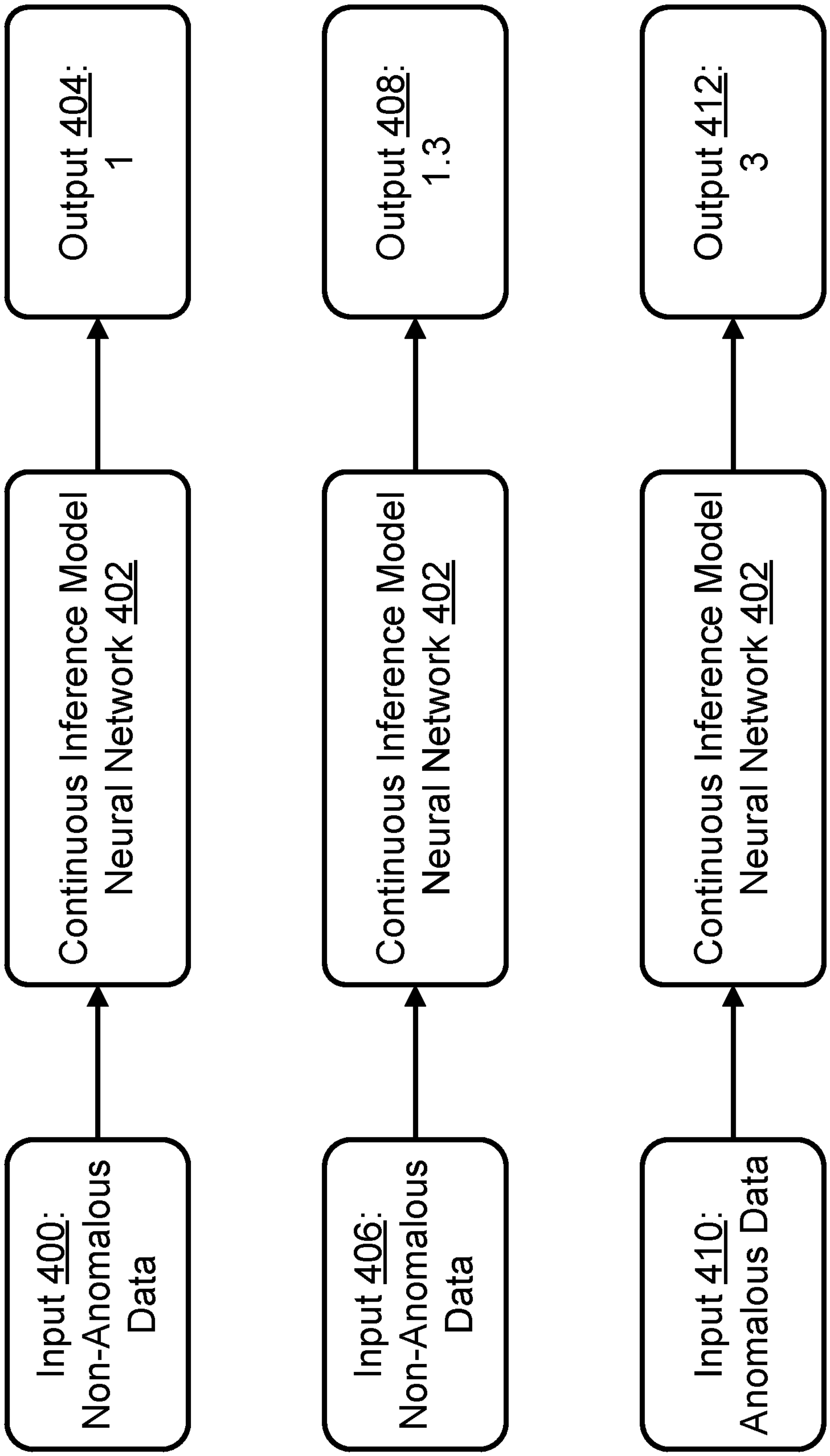
FIGS. 4A-4D show block diagrams illustrating a system in accordance with an embodiment over time.
Figure 4B:
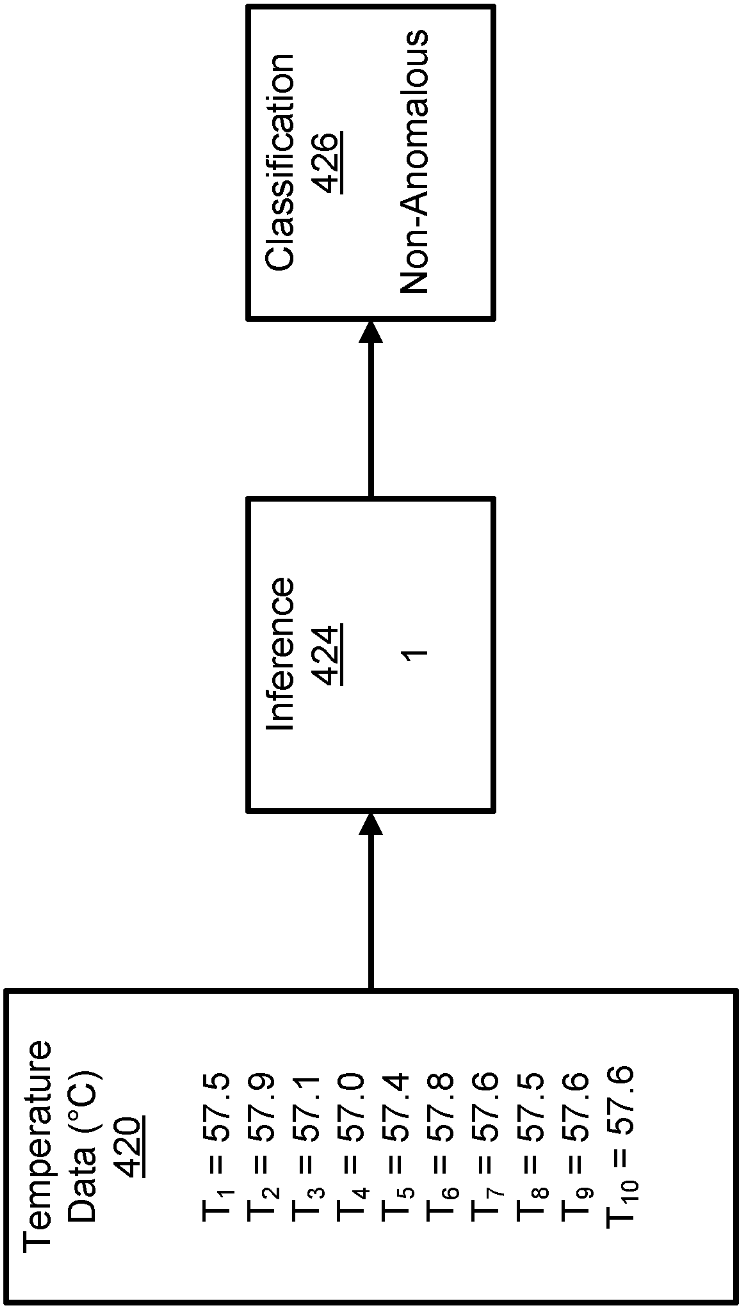
Figure 4C:
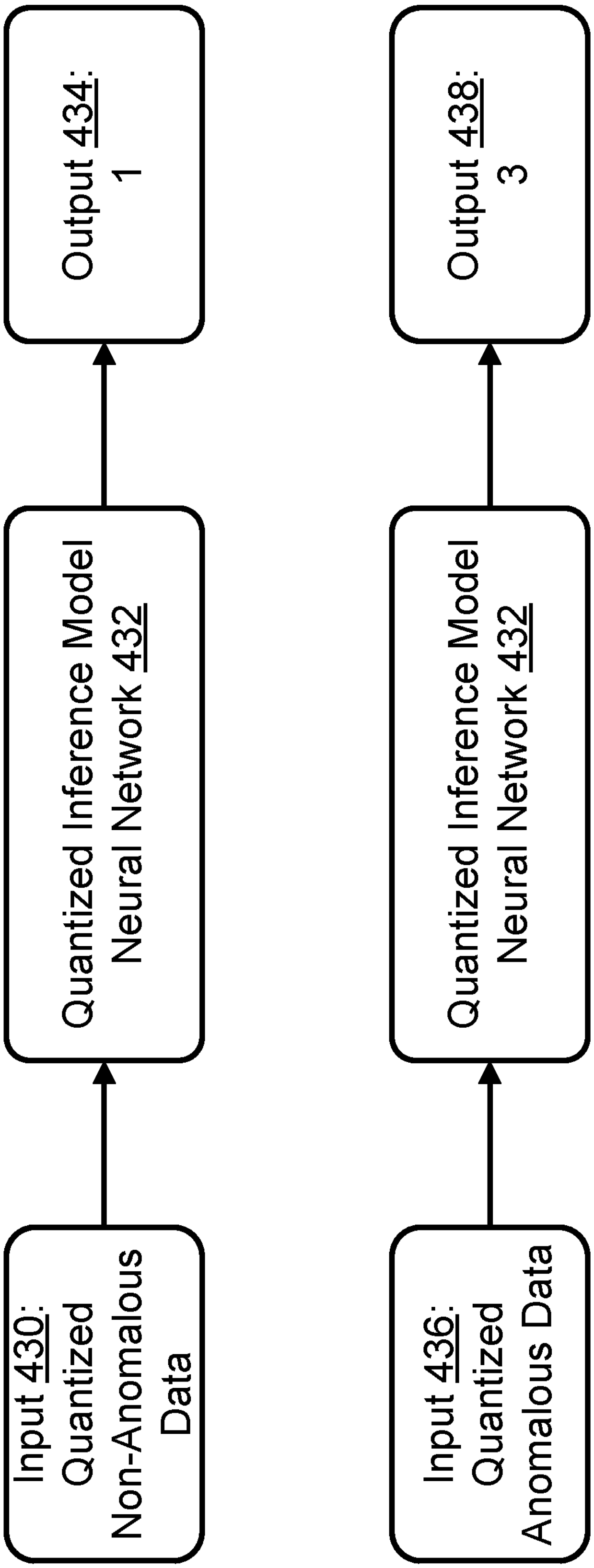
Figure 4D:
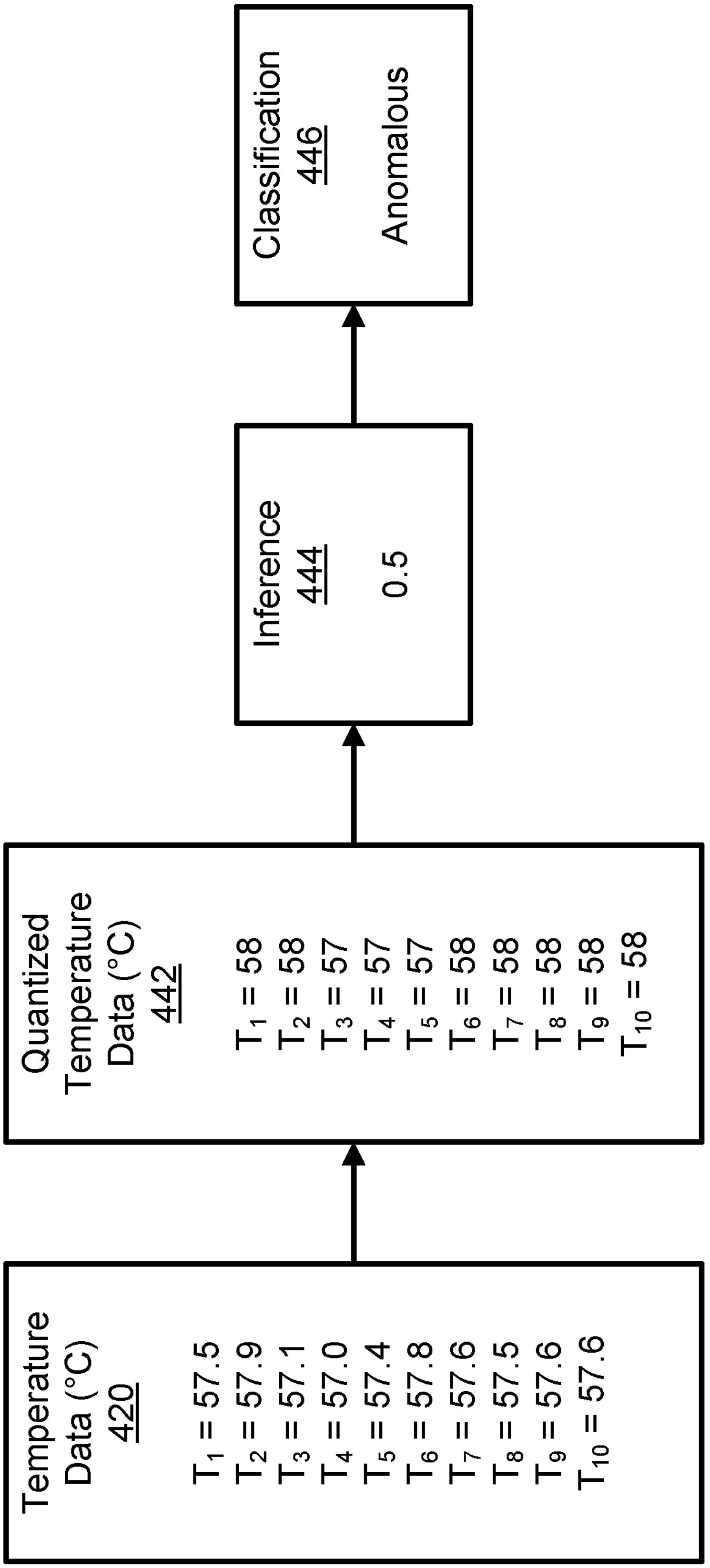

At operation 332, a second inference is obtained using a quantized inference model. The second inference may be intended to map to a previously established fixed output value within a threshold when the data is not anomalous. An output value outside of this threshold may indicate the presence of an anomaly in the data. The quantized inference model may be, for example, a machine learning model (e.g., a neural network) and/or any other type of predictive model trained to identify anomalies in quantized data obtained from data collectors 100. Refer to FIGS. 4C-4D for additional details regarding the quantized inference model. The quantized inference model may be trained using quantized anomaly detection training data (not shown) to obtain an initially trained model. Quantized anomaly detection training data may include a labeled dataset of data (e.g., including both anomalous and non-anomalous data) or may be unlabeled as previously described with respect to the continuous anomaly detection training data. By quantizing the anomaly detection training data, each quantized data value in the set of quantized data values making up the quantized anomaly detection training data may correspond to a range of possible input values. The quantized data values may encompass all (or a portion of) possible non-anomalous input values for the quantized inference model. Consequently, the inference model may be less likely to encounter and erroneously label unseen non-anomalous data as anomalous. In some embodiments, a static inference model may be used instead of the quantized inference model. The static inference model may be forbidden from undergoing re-training and, therefore, may be less susceptible to data drift than the continuous inference model. The inference may be used to determine whether an anomaly is present in the data as described below.

At operation 334, it is determined whether the second inference falls within the anomaly threshold. The anomaly threshold may define a range of values of the second inference considered non-anomalous for the purposes of the computer implemented services provided by anomaly detector 102. If the second inference is within the anomaly threshold, the data may be considered non-anomalous. However, if the second inference falls outside the anomaly threshold, the data may be classified as anomalous, as shown in operation 336. For example, a frame of a video recording showing a person on the property may generate an output value outside the anomaly threshold (e.g., a range of output values indicating that no persons should be present at that time) and may be classified as an anomaly.

If it is determined that the second inference is within the anomaly threshold, then the method may proceed to operation 338. If not, the method may proceed to operation 336.

At operation 336, the data may be classified as anomalous data to obtain the second classification. The data may be classified as anomalous data by, for example, labeling (e.g., flagging) the data as being anomalous, initiating performance of various actions in response to the data being classified as being anomalous, and/or via other methods.

At operation 338, the data may be classified as non-anomalous data to obtain the second classification. The data may be classified as non-anomalous data by, for example, labeling (e.g., flagging) the data as being non-anomalous, initiating performance of various actions in response to the data being classified as being non-anomalous, and/or via other methods.

The method may end following operation 338.

Figure 3D:
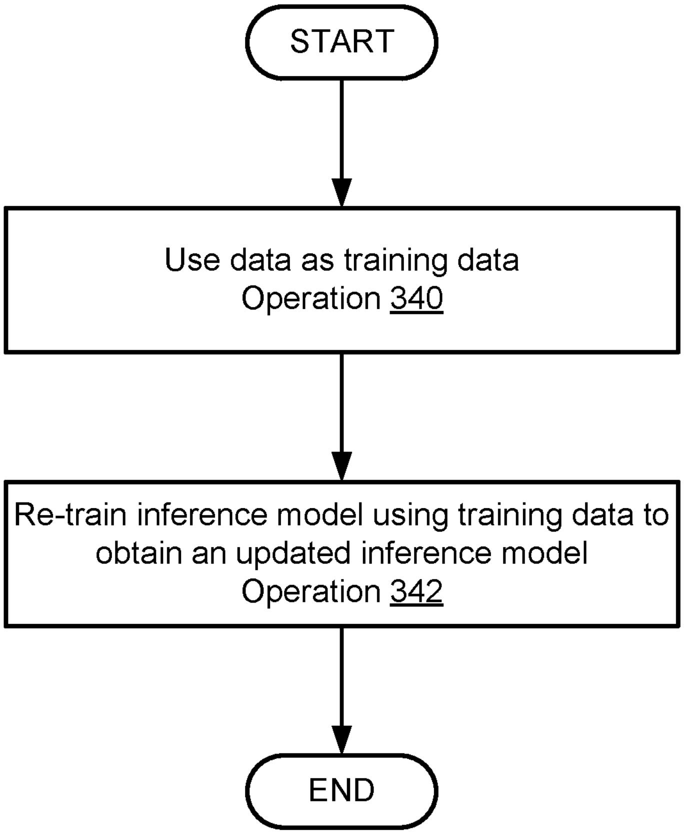
FIG. 3D shows a flow diagram illustrating a method of improving anomaly detection capabilities of the inference model through re-training in accordance with an embodiment.

Turning to FIG. 3D, a flow diagram illustrating a method of improving anomaly detection capabilities of an inference model through re-training in accordance with an embodiment is shown. An inference model (either the continuous inference model, the quantized inference model, or both) may be updated via re-training. In a first example, one or more of the inference models may be re-trained if unseen non-anomalous data is erroneously labeled as anomalous data. Therefore, the unseen non-anomalous data may be utilized as training data to expand the inference model's ability to detect non-anomalous data. In a second example, one or more of the inference models may be re-trained to purposefully adapt the inference model to data drift as previously described with respect to operation 308 in FIG. 3A. Therefore, the following operations may be performed by the continuous inference model and/or the quantized inference model in response to various conditions being met. Alternatively, the quantized inference model may be forbidden from undergoing re-training and, therefore, may not participate in the operations described below.

At operation 340, the data may be used as training data. The data may be used as training data by labeling it as training data for ingest into a training process for an inference model.

At operation 342, the inference model (e.g., the continuous inference model, the quantized inference model, or both) is re-trained to obtain an updated inference model. The continuous inference model may be continuously re-trained during anomaly detection. The quantized inference model may not be continuously re-trained and may be only re-trained in the event of purposeful adaption to data drift as previously described. The inference model may be retrained using a partial re-training process. The partial re-training process may include freezing (e.g., rendering unaffected by the re-training process) a portion of the inference model. The frozen portion may be chosen randomly during each instance of re-training. The size of the frozen portion may be selected via any method (e.g., heuristically, deterministically based on characteristics of the inference model such as size, accuracy level, etc.). For example, the anomaly detector 102 may freeze a random 75% of the inference model during each re-training process. Therefore, only the portion of the inference model not included in the frozen portion (e.g., the remaining 25% in this example) may be modified during re-training of the inference model.

In an embodiment, the inference model is re-trained by (i) freezing some of the parameters of a neural network (e.g., weights of connections between neurons), (ii) establishing an objective function that optimizes for the machine learning model to output the data for a given input, and (iii) iteratively modifying the parameters that are not frozen until the objective function is optimized. The re-training may be performed via other methods depending on the type of inference model (e.g., other than a neural network) and/or other factors without departing from embodiments disclosed herein.

Re-training the inference model may generate an updated inference model. The updated inference model may be used in place of the inference model and no copies of the inference model may be retained on the anomaly detector 102. By doing so, storage resources may be freed (e.g., by not retaining old copies of inference models) and the most up-to-date version of the inference model may be the only version of the inference model available for use. Therefore, the anomaly detection capabilities of the inference model may be continuously improved by anomaly detector 102 during collection of data and detection of anomalies in the data.

The method may end following operation 342.

Turning to FIG. 4A, three examples are shown of input data being mapped to a single output value using a continuous inference model neural network (continuous inference model neural network 402). In these examples, continuous inference model neural network 402 is trained to map non-anomalous input data to a fixed output value of 1. Therefore, any non-anomalous data used as an ingest for neural network 402 will likely generate an output of 1, or be close to 1 depending on how well the training data used to train the neural network inference model covers the full range of non-anomalous ingest data.

In a first example (the topmost section of FIG. 4A), input 400 includes non-anomalous data. The non-anomalous data is treated as the ingest for continuous inference model neural network 402 and output 404 of 1 is generated. Therefore, in this first example, continuous inference model neural network 402 operates as intended and classifies output 404 as non-anomalous data.

In a second example (the middle section of FIG. 4A), input 406 includes non-anomalous data. However, input 406 may include data never before seen by continuous inference model neural network 402 (during training or otherwise). Therefore, even though the input 406 includes non-anomalous data, the continuous inference model neural network 402 generates output 408 of 1.3. As this output is not 1, an anomaly detector hosting the continuous inference model neural network 402 (not shown) may determine whether output 408 includes an anomaly. To do so, the anomaly detector may compare output 408 to an anomaly threshold. The anomaly threshold may specify that any output value over 2 or below 0 includes an anomaly. As output 408 does not include a value over 2 or below 0, the anomaly detector may determine that output 408 does not include an anomaly. However, the anomaly detector may compare output 408 to a second threshold (a calibration threshold). The calibration threshold may dictate that any output value between 1.1 and 2 (or between 0.9 and 0) may include non-anomalous data unknown to continuous inference model neural network 402. The anomaly detector may consider values between 1 and 1.1 (and between 1 and 0.9) as non-anomalous in accordance with the current training of the continuous inference model neural network 402. An output value outside the calibration threshold (but within the anomaly threshold) may include data useful for re-training of continuous inference model neural network 402 (in order to train continuous inference model neural network 402 to recognize non-anomalous data in potentially new situations and/or environments). Therefore, the anomaly detector may choose to re-train continuous inference model neural network 402 using data included in input 406.

In a third example (the lowest section of FIG. 4A), input 410 includes anomalous data. The anomalous data is treated as the ingest for continuous inference model neural network 402 and output 412 of 3 is generated. The anomaly detector may compare output 412 to the anomaly threshold and may determine that output 412 contains anomalous data (e.g., via being outside the anomaly threshold of 2). The anomaly detector may perform an action set based on the anomalous data, may inform a downstream consumer of the anomalous data, and/or may perform other actions as needed to address the presence of anomalous data in input 410.

Turning to FIG. 4B, consider a scenario in which temperature data is collected in an industrial environment. In this industrial environment, maintaining a consistent temperature range may be critical to a process (e.g., a chemical synthesis, or the like). A temperature sensor may be a data collector and may collect temperature data 420 over the course of one hour. The temperature sensor may transmit temperature data 420 to an anomaly detector (not shown) or may perform the following actions itself. The temperature data 420 may be used as ingest for a continuous inference model trained to generate inferences based on continuous input data and map non-anomalous data to a fixed output value of 1. As shown by inference 424, temperature data 420 generates an inference of 1 and, therefore, indicates no anomalies in temperature data 420. Consequently, the anomaly detector may obtain classification 426 of non-anomalous.

Turning to FIG. 4C, two examples are shown of input data being mapped to a single output value using a quantized inference model neural network (quantized inference model neural network 432). In these examples, quantized inference model neural network 432 is trained to map non-anomalous input data to a fixed output value of 1. Therefore, any non-anomalous data used as an ingest for neural network 432 will likely generate an output of 1 (or very close to 1 within some threshold) due to the quantized training data used to train the neural network inference model that covers the full (or a significant portion of the) range of non-anomalous ingest data.

In a first example (the top section of FIG. 4C), input 430 includes quantized non-anomalous data. By quantizing the input data, it is less likely that the quantized inference model neural network 432 will encounter never before seen non-anomalous data as described in FIG. 4A. The quantized non-anomalous data is treated as the ingest for quantized inference model neural network 432 and output 434 of 1 is generated. Therefore, in this first example, quantized inference model neural network 432 classifies output 434 as non-anomalous data.

In a second example (the bottom section of FIG. 4C), input 436 includes quantized anomalous data. The quantized anomalous data is treated as the ingest for quantized inference model neural network 432 and output 438 of 3 is generated. The anomaly detector may compare output 438 to the fixed output value of 1 and may determine that output 438 contains anomalous data (by being outside of the anomaly threshold of above 2 or below 0 as previously described in FIG. 4A). The anomaly detector may perform an action set based on the anomalous data, may inform a downstream consumer of the anomalous data, and/or may perform other actions as needed to address the presence of anomalous data in input 436. In some embodiments, output from quantized inference model neural network 432 may be compared to output from continuous inference model neural network 402 to determine whether data drift has occurred in the input data.

Turning to FIG. 4D, consider a second scenario in which the temperature data collected in FIG. 4B is checked for data drift. To determine whether data drift has occurred, the anomaly detector may quantize temperature data 420 to obtain quantized temperature data 442. As an example, at $T_1$, the temperature may have a true value of 57.5° C. and may be quantized to a value of 58° C. This process may be performed for each temperature value in temperature data 420. The quantized temperature data 442 may be used as ingest for a quantized inference model trained to map non-anomalous data to a fixed output value of 1. As shown by inference 444, all temperature values collected during the hour generate an inference of 0.5 and, therefore, include anomalous data. The anomaly detector may obtain classification 446 of anomalous.

As the continuous inference model obtained classification 426 of non-anomalous (shown in FIG. 4B) and the quantized inference model obtained classification 446 of anomalous, data drift may have occurred, and the continuous inference model used to obtain classification 446 may have adapted over time to data drift in the temperature data obtained from the temperature sensor. The continuous inference model may adapt to data drift, for example, by undergoing a continuous re-training process to expand the anomaly detection capabilities of the continuous inference model. The quantized inference model may not undergo re-training and, therefore, may not adapt to data drift. The anomaly detector (and/or a downstream consumer or other entity responsible for responding to data drifts) may perform an action set to intervene with the data drift. Additionally, the anomaly detector (and/or a downstream consumer or other entity) may perform an action set in response to the anomaly in the data identified by the quantized inference model.

Figure 5:
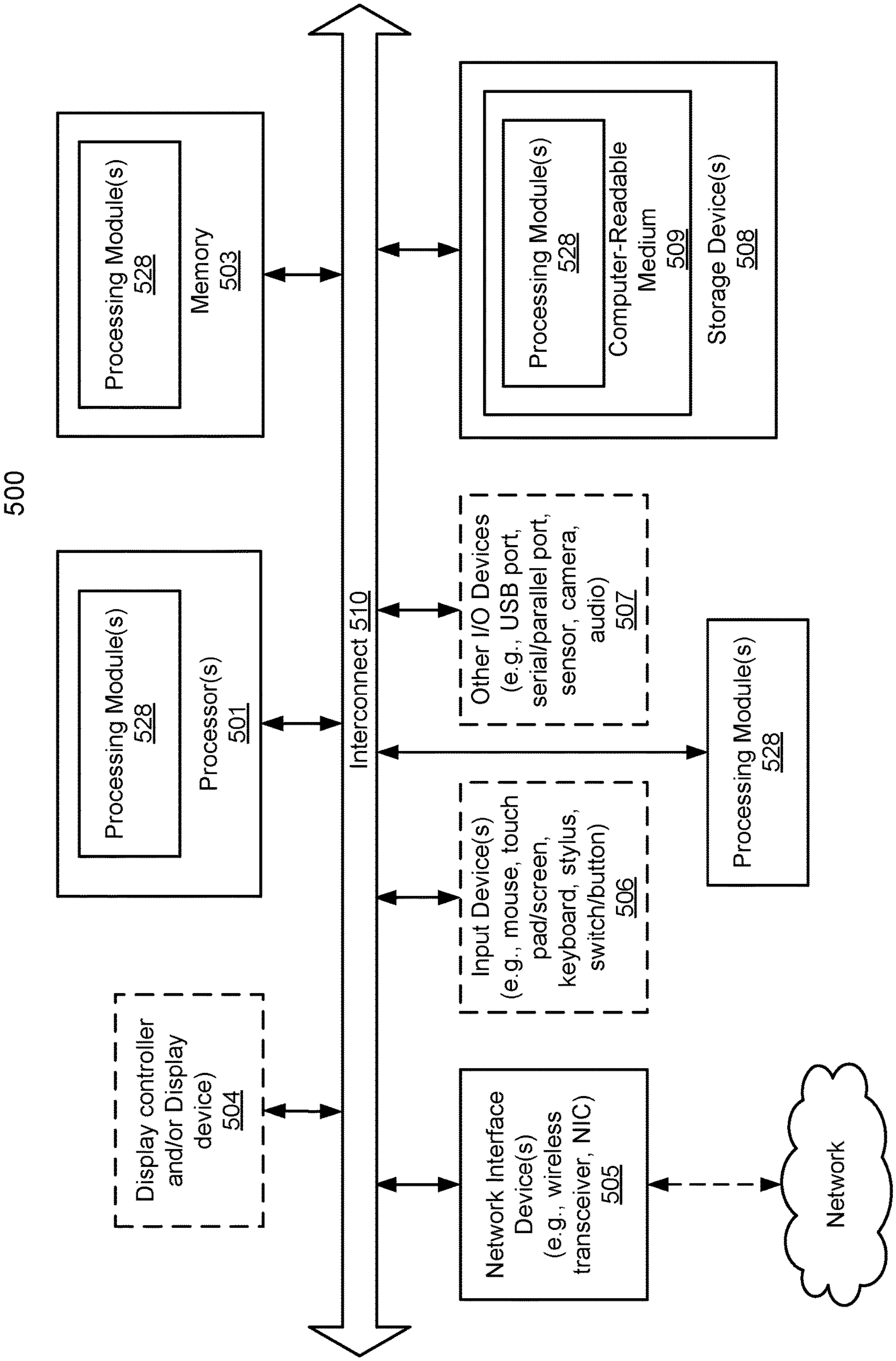
FIG. 5 shows a block diagram illustrating a data processing system in accordance with an embodiment.

Any of the components illustrated in FIGS. 1-4D may be implemented with one or more computing devices. Turning to FIG. 5, a block diagram illustrating an example of a data processing system (e.g., a computing device) in accordance with an embodiment is shown. For example, system 500 may represent any of data processing systems described above performing any of the processes or methods described above. System 500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 500 is intended to show a high level view of many components of the computer system. However, it is to be understood that additional components may be present in certain implementations and furthermore, different arrangement of the components shown may occur in other implementations. System 500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 500 includes processor 501, memory 503, and devices 505-507 via a bus or an interconnect 510. Processor 501 may represent a single processor or multiple processors with a single processor core or multiple processor cores included therein. Processor 501 may represent one or more general-purpose processors such as a microprocessor, a central processing unit (CPU), or the like. More particularly, processor 501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 501, which may be a low power multi-core processor socket such as an ultra-low voltage processor, may act as a main processing unit and central hub for communication with the various components of the system. Such processor can be implemented as a system on chip (SoC). Processor 501 is configured to execute instructions for performing the operations discussed herein. System 500 may further include a graphics interface that communicates with optional graphics subsystem 504, which may include a display controller, a graphics processor, and/or a display device.

Processor 501 may communicate with memory 503, which in one embodiment can be implemented via multiple memory devices to provide for a given amount of system memory. Memory 503 may include one or more volatile storage (or memory) devices such as random access memory (RAM), dynamic RAM (DRAM), synchronous DRAM (SDRAM), static RAM (SRAM), or other types of storage devices. Memory 503 may store information including sequences of instructions that are executed by processor 501, or any other device. For example, executable code and/or data of a variety of operating systems, device drivers, firmware (e.g., input output basic system or BIOS), and/or applications can be loaded in memory 503 and executed by processor 501. An operating system can be any kind of operating systems, such as, for example, Windows® operating system from Microsoft®, Mac OS®/iOS® from Apple, Androids® from Google®, Linux®, Unix®, or other real-time or embedded operating systems such as VxWorks.

System 500 may further include IO devices such as devices (e.g., 505, 506, 507, 508) including network interface device(s) 505, optional input device(s) 506, and other optional IO device(s) 507. Network interface device(s) 505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The MC may be an Ethernet card.

Input device(s) 506 may include a mouse, a touch pad, a touch sensitive screen (which may be integrated with a display device of optional graphics subsystem 504), a pointer device such as a stylus, and/or a keyboard (e.g., physical keyboard or a virtual keyboard displayed as part of a touch sensitive screen). For example, input device(s) 506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 507 may include an audio device. An audio device may include a speaker and/or a microphone to facilitate voice-enabled functions, such as voice recognition, voice replication, digital recording, and/or telephony functions. Other IO devices 507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 510 via a sensor hub (not shown), while other devices such as a keyboard or thermal sensor may be controlled by an embedded controller (not shown), dependent upon the specific configuration or design of system 500.

To provide for persistent storage of information such as data, applications, one or more operating systems and so forth, a mass storage (not shown) may also couple to processor 501. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 501, e.g., via a serial peripheral interface (SPI). This flash device may provide for non-volatile storage of system software, including a basic input/output software (BIOS) as well as other firmware of the system.

Storage device 508 may include computer-readable storage medium 509 (also known as a machine-readable storage medium or a computer-readable medium) on which is stored one or more sets of instructions or software (e.g., processing module, unit, and/or processing module/unit/logic 528) embodying any one or more of the methodologies or functions described herein. Processing module/unit/logic 528 may represent any of the components described above. Processing module/unit/logic 528 may also reside, completely or at least partially, within memory 503 and/or within processor 501 during execution thereof by system 500, memory 503 and processor 501 also constituting machine-accessible storage media. Processing module/unit/logic 528 may further be transmitted or received over a network via network interface device(s) 505.

Computer-readable storage medium 509 may also be used to store some software functionalities described above persistently. While computer-readable storage medium 509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 528, components and other features described herein can be implemented as discrete hardware components or integrated in the functionality of hardware components such as ASICS, FPGAs, DSPs or similar devices. In addition, processing module/unit/logic 528 can be implemented as firmware or functional circuitry within hardware devices. Further, processing module/unit/logic 528 can be implemented in any combination hardware devices and software components.

Note that while system 500 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method of providing computer-implemented services, the method comprising:

obtaining, by an anomaly detector, data from a data collector;

performing, by the anomaly detector, a continuous anomaly detection process using a continuous inference model to obtain a first classification that indicates the data is anomalous, the continuous anomaly detection process comprises:

classifying, by the anomaly detector, the data using the continuous inference model and an anomaly threshold to obtain the first classification, the first classification specifying whether the data is anomalous or non-anomalous, the continuous inference model being hosted by a computing device that also hosts the anomaly detector; and performing, by the anomaly detector and in parallel to the continuous anomaly detection process, a quantized anomaly detection process using a quantized inference model to obtain a second classification that indicates whether the data is anomalous, the quantized anomaly detection process comprises:

classifying, by the anomaly detector, the data using the quantized inference model and the anomaly threshold to obtain the second classification, the second classification being separate from the first classification and also specifies whether the data is anomalous or non-anomalous, the quantized inference model also being hosted by the computing device; and performing, by the anomaly detector using the first classification and the second classification and only when the first classification indicates that the data is non-anomalous and regardless of a result of the second classification, a data drift detection process separate from both the continuous anomaly detection process and the quantized anomaly detection process to determine whether the continuous inference model has adapted to data drift, wherein a determination as to whether to perform the data drift detection process is independent of the result of the second classification, and the data drift detection process comprises:

making a first determination, by the anomaly detector, regarding whether the second classification specifies that the data is anomalous while the first classification indicates that the data is non-anomalous; and in a first instance of the first determination where the second classification specifies that the data is anomalous while the first classification indicates that the data is non-anomalous:

determining, by the anomaly detector, that the continuous inference model has adapted to the data drift; and performing a first action set in response to determining that the continuous inference model has adapted to the data drift to modify operations of the computing device, the operations being associated with the continuous inference model.

2. The method of claim 1, wherein performing the data drift detection process further comprises:

in a second instance of the first determination where the second classification does not specify that the data is anomalous while the first classification indicates that the data is non-anomalous:

making a second determination that the continuous inference model has not adapted to the data drift; and discarding, in response to the second determination and without modifying the operations associated with the continuous inference model, the data entirely from the computing device such that no parts or copies of the data are retained on the computing device after the discarding is completed.

3. The method of claim 2, wherein classifying the data using the continuous inference model comprises:

obtaining a first inference using the continuous inference model and the data;

making a third determination regarding whether the first inference is within the anomaly threshold;

in a first instance of the third determination where the first inference is within the anomaly threshold, classifying the data as non-anomalous to obtain the first classification; and in a second instance of the third determination where the first inference is not within the anomaly threshold, classifying the data as anomalous to obtain the first classification.

4. The method of claim 1, wherein classifying the data using the quantized inference model comprises:

quantizing the data obtained from the data collector to obtain a quantized version of the data;

obtaining a second inference using the quantized inference model and the quantized version of the data;

making a fourth determination regarding whether the second inference is within the anomaly threshold;

in a first instance of the fourth determination where the second inference is within the anomaly threshold, classifying the data as non-anomalous to obtain the second classification; and in a second instance of the fourth determination where the second inference is not within the anomaly threshold, classifying the data as anomalous to obtain the second classification.

5. The method of claim 4, wherein quantizing the data obtained from the data collector comprises:

identifying a quantized data value corresponding to each data value of the data using a schema for quantizing data and a set of quantized data values; and obtaining the quantized version of the data using the quantized data value corresponding to each data value of the data.

6. The method of claim 5, wherein the schema specifies a range of the data uniquely corresponding to each quantized data value of the set of quantized data values.

7. The method of claim 3, wherein the first action set comprises alerting a downstream consumer of the data drift.

8. The method of claim 7, wherein the first action set comprises initiating a re-training process to obtain an updated inference model using at least one of the continuous inference model or the quantized inference model.

9. The method of claim 8, wherein initiating the re-training process comprises:

treating the data as training data; and freezing a portion of an inference model prior to re-training the inference model to obtain a frozen portion of the inference model, the freezing of the portion of the inference model renders the frozen portion of the inference model unaffected by re-training of the inference model, and the inference model being at least one of the inference model or the quantized inference model; and modifying portions of the inference model that are not part of the frozen portion of the inference model based on the training data to obtain the updated inference model.

10. A non-transitory machine-readable medium having instructions stored therein, which when executed by a processor, cause the processor to perform first operations for providing computer-implemented services, the first operations comprising:

obtaining, by an anomaly detector, data from a data collector;

performing, by the anomaly detector, a continuous anomaly detection process using a continuous inference model to obtain a first classification that indicates the data is anomalous, the continuous anomaly detection process comprises:

classifying, by the anomaly detector, the data using the continuous inference model and an anomaly threshold to obtain the first classification, the first classification specifying whether the data is anomalous or non-anomalous, the continuous inference model being hosted by a computing device that also hosts the anomaly detector; and performing, by the anomaly detector and in parallel to the continuous anomaly detection process, a quantized anomaly detection process using a quantized inference model to obtain a second classification that indicates whether the data is anomalous, the quantized anomaly detection process comprises:

classifying, by the anomaly detector, the data using the quantized inference model and the anomaly threshold to obtain the second classification, the second classification being separate from the first classification and also specifies whether the data is anomalous or non-anomalous, the quantized inference model also being hosted by the computing device; and performing, by the anomaly detector using the first classification and the second classification and only when the first classification indicates that the data is non-anomalous and regardless of a result of the second classification, a data drift detection process separate from both the continuous anomaly detection process and the quantized anomaly detection process to determine whether the continuous inference model has adapted to data drift, wherein a determination as to whether to perform the data drift detection process is independent of the result of the second classification, and the data drift detection process comprises:

making a first determination, by the anomaly detector, regarding whether the second classification specifies that the data is anomalous while the first classification indicates that the data is non-anomalous; and in a first instance of the first determination where the second classification specifies that the data is anomalous while the first classification indicates that the data is non-anomalous:

determining, by the anomaly detector, that the continuous inference model has adapted to the data drift; and performing a first action set in response to determining that the continuous inference model has adapted to the data drift to modify second operations of the computing device, the second operations being associated with the continuous inference model.

11. The non-transitory machine-readable medium of claim 10, wherein performing the data drift detection process further comprises:

in a second instance of the first determination where the second classification does not specify that the data is anomalous while the first classification indicates that the data is non-anomalous:

making a second determination that the continuous inference model has not adapted to the data drift; and discarding, in response to the second determination and without modifying the second operations associated with the continuous inference model, the data entirely from the computing device such that no parts or copies of the data are retained on the computing device after the discarding is completed.

12. The non-transitory machine-readable medium of claim 11, wherein classifying the data using the continuous inference model comprises:

obtaining a first inference using the continuous inference model and the data;

making a third determination regarding whether the first inference is within the anomaly threshold;

in a first instance of the third determination where the first inference is within the anomaly threshold, classifying the data as non-anomalous to obtain the first classification; and in a second instance of the third determination where the first inference is not within the anomaly threshold, classifying the data as anomalous to obtain the first classification.

13. The non-transitory machine-readable medium of claim 12, wherein classifying the data using the quantized inference model comprises:

quantizing the data to obtain quantized data;

obtaining a second inference using the quantized inference model and the quantized data;

making a fourth determination regarding whether the second inference is within the anomaly threshold;

in a first instance of the fourth determination where the second inference is within the anomaly threshold, classifying the data as non-anomalous to obtain the second classification; and in a second instance of the fourth determination where the second inference is not within the anomaly threshold, classifying the data as anomalous to obtain the second classification.

14. The non-transitory machine-readable medium of claim 13, wherein quantizing the data comprises:

identifying a quantized data value corresponding to each data value of the data using a schema for quantizing data and a set of quantized data values; and obtaining the quantized data using the quantized data value corresponding to each data value of the data.

15. A data processing system, comprising:

a processor; and a memory coupled to the processor to store instructions, which when executed by the processor, cause the processor to perform first operations for providing computer-implemented services, the first operations comprising:

obtaining, by an anomaly detector, data from a data collector;

performing, by the anomaly detector, a continuous anomaly detection process using a continuous inference model to obtain a first classification that indicates the data is anomalous, the continuous anomaly detection process comprises:

classifying, by the anomaly detector, the data using the continuous inference model and an anomaly threshold to obtain the first classification, the first classification specifying whether the data is anomalous or non-anomalous, the continuous inference model being hosted by a computing device that also hosts the anomaly detector; and performing, by the anomaly detector and in parallel to the continuous anomaly detection process, a quantized anomaly detection process using a quantized inference model to obtain a second classification that indicates whether the data is anomalous, the quantized anomaly detection process comprises:

classifying, by the anomaly detector, the data using the quantized inference model and the anomaly threshold to obtain the second classification, the second classification being separate from the first classification and also specifies whether the data is anomalous or non-anomalous, the quantized inference model also being hosted by the computing device; and performing, by the anomaly detector using the first classification and the second classification and only when the first classification indicates that the data is non-anomalous and regardless of a result of the second classification, a data drift detection process separate from both the continuous anomaly detection process and the quantized anomaly detection process to determine whether the continuous inference model has adapted to data drift, wherein a determination as to whether to perform the data drift detection process is independent of a result of the second classification, and the data drift detection process comprises:

making a first determination, by the anomaly detector, regarding whether the second classification specifies that the data is anomalous while the first classification indicates that the data is non-anomalous; and in a first instance of the first determination where the second classification specifies that the data is anomalous while the first classification indicates that the data is non-anomalous:

determining, by the anomaly detector, that the continuous inference model has adapted to the data drift; and performing a first action set in response to determining that the continuous inference model has adapted to the data drift to modify second operations of the computing device, the second operations being associated with the continuous inference model.

16. The data processing system of claim 15, wherein performing the data drift detection process further comprises:

in a second instance of the first determination where the second classification does not specify that the data is anomalous while the first classification indicates that the data is non-anomalous:

making a second determination that the continuous inference model has not adapted to the data drift; and discarding, in response to the second determination and without modifying the second operations associated with the continuous inference model, the data entirely from the computing device such that no parts or copies of the data are retained on the computing device after the discarding is completed.

17. The data processing system of claim 16, wherein classifying the data using the continuous inference model comprises:

obtaining a first inference using the continuous inference model and the data;

making a third determination regarding whether the first inference is within the anomaly threshold;

in a first instance of the third determination where the first inference is within the anomaly threshold, classifying the data as non-anomalous to obtain the first classification; and in a second instance of the third determination where the first inference is not within the anomaly threshold, classifying the data as anomalous to obtain the first classification.

18. The method of claim 1, wherein the continuous inference model is adapted to generate inferences over a continuous range of values, the quantized inference model is adapted to generate inferences over a quantized range of values, the continuous range and the quantized range having a same extent.

19. The method of claim 18, wherein the continuous inference model is based on a first training data set of values varying over the continuous range of values, and the quantized inference model being based on a quantized version of the first training data that of quantized values that vary over the quantized range of values.

20. The data processing system of claim 17, wherein classifying the data using the quantized inference model comprises:

quantizing the data to obtain quantized data;

obtaining a second inference using the quantized inference model and the quantized data;

making a fourth determination regarding whether the second inference is within the anomaly threshold;

in a first instance of the fourth determination where the second inference is within the anomaly threshold, classifying the data as non-anomalous to obtain the second classification; and in a second instance of the fourth determination where the second inference is not within the anomaly threshold, classifying the data as anomalous to obtain the second classification.

* * * * *